(12) United States Patent
Krueger et al.

(10) Patent No.: US 7,998,232 B2
(45) Date of Patent: Aug. 16, 2011

(54) HOUSING WHICH CAN BE SECURED TO A MOTOR VEHICLE WITH AN INTEGRATED PEDESTRAIN PROTECTION FUNCTION

(75) Inventors: Joern-Uwe Krueger, Morsbach (DE);
Werner Gerhard, Hamm/Sieg (DE);
Daniel Rolf Merz, Nuembrecht (DE);
Bernhard Beer, Waldbroehl (DE);
Rudolf Wimmer, Haidershofen (AT)

(73) Assignees: Montaplast GmbH, Morsbach (DE);
Bayerische Motorenwerke AG, Munich (DE)

( * ) Notice: Subject to any disclaimer, the term of this patent is extended or adjusted under 35 U.S.C. 154(b) by 268 days.

(21) Appl. No.: 12/301,072

(22) PCT Filed: May 16, 2007

(86) PCT No.: PCT/DE2007/000891
§ 371 (c)(1),
(2), (4) Date: Nov. 17, 2008

(87) PCT Pub. No.: WO2007/131497
PCT Pub. Date: Nov. 22, 2007

(65) Prior Publication Data
US 2009/0242309 A1 Oct. 1, 2009

(30) Foreign Application Priority Data

May 17, 2006 (DE) .......................... 10 2006 023 350
Oct. 16, 2006 (DE) ..................... 20 2006 016 033 U

(51) Int. Cl.
*B60J 7/00* (2006.01)
(52) U.S. Cl. .................... 55/385.3; 180/69.21; 180/274; 296/187.04; 296/193.11; 292/201; 292/216

(58) Field of Classification Search ................. 55/385.1, 55/385.3; 180/69.21, 274; 296/187.04, 193.11; 292/201, 216, DIG. 23, DIG. 65
See application file for complete search history.

(56) References Cited

U.S. PATENT DOCUMENTS

| | | | | |
|---|---|---|---|---|
| 6,802,556 B2 * | 10/2004 | Mattsson et al. | ......... | 296/187.09 |
| 7,597,384 B2 * | 10/2009 | Wallman et al. | ......... | 296/187.04 |
| 7,712,569 B2 * | 5/2010 | Scheuch et al. | ............... | 180/274 |
| 7,823,959 B2 * | 11/2010 | Wallman et al. | ......... | 296/187.04 |
| 7,845,691 B2 * | 12/2010 | Sundararajan et al. | ....... | 292/216 |
| 2001/0040392 A1 * | 11/2001 | Yoshida | ................... | 296/203.02 |

(Continued)

FOREIGN PATENT DOCUMENTS

DE 10000630 A1 9/2000
(Continued)

*Primary Examiner* — Duane Smith
*Assistant Examiner* — Minh-Chau Pham
(74) *Attorney, Agent, or Firm* — Panitch Schwarze Belisario & Nadel LLP

(57) ABSTRACT

A housing can be secured to a motor vehicle and has a first housing portion (4) and a second housing portion (2) which can be connected thereto. To integrate a pedestrian protection function and to provide a defined relative movement of the housing portions in relation to each other, it is proposed to provide on the first housing portion an elongate support element (10), which is connected with a proximal end to the first housing portion and has a distally disposed effective end having an effective cross-section (6), and the second housing portion (2) includes an elastic fixing element with a through opening, the inside diameter of which is smaller than the effective cross-section.

17 Claims, 4 Drawing Sheets

U.S. PATENT DOCUMENTS

| | | | | |
|---|---|---|---|---|
| 2006/0072332 A1* | 4/2006 | Arlon | | 362/509 |
| 2006/0220418 A1* | 10/2006 | Behr et al. | | 296/187.04 |
| 2007/0084663 A1* | 4/2007 | Wanami et al. | | 180/274 |
| 2009/0178872 A1* | 7/2009 | Wallman et al. | | 180/274 |
| 2009/0295193 A1* | 12/2009 | Park | | 296/187.04 |
| 2009/0315343 A1* | 12/2009 | Gonin | | 293/102 |
| 2010/0194126 A1* | 8/2010 | De Queiroz et al. | | 293/132 |

FOREIGN PATENT DOCUMENTS

| | | |
|---|---|---|
| DE | 10314220 A1 | 10/2004 |
| DE | 102005014535 A1 | 10/2005 |
| DE | 102005046407 A1 | 4/2006 |
| DE | 102004054274 A1 | 5/2006 |
| EP | 1426237 A1 | 6/2004 |

* cited by examiner

Force/travel characteristic in the case
of a defined deceleration by way of example Configuration by way of example of the consumed work (W) in relation to time during a defined deceleration by way of example

HOUSING WHICH CAN BE SECURED TO A MOTOR VEHICLE WITH AN INTEGRATED PEDESTRAIN PROTECTION FUNCTION

CROSS-REFERENCE TO RELATED APPLICATIONS

This application is a Section 371 of International Application No. PCT/DE2007/000891, filed May 16, 2007, which was published in the English language on Nov. 22, 2007, under International Publication No. WO 2007/131497 A1 and the disclosure of which is incorporated herein by reference.

BACKGROUND OF THE INVENTION

The invention concerns a housing which can be secured to components of a motor vehicle comprising a first housing portion and a second housing portion which can be secured thereto. The components can be, for example, the bodywork, the engine or further assemblies. In that respect the housing portions usually enclose a hollow space between them.

Housings of that kind are used, for example, as air filter housings which are usually arranged in an engine compartment of a motor vehicle above an engine and beneath an engine cover for accommodating an air filter insert.

Existing housings are rigid and can result in injuries to pedestrians in the event of an accident, if the part of the bodywork covering them strikes against the rigid housing.

New legal regulations therefore require, in regard to pedestrian protection and the crash characteristics, a limited flexibility on the part of certain portions of the motor vehicle and, in particular, the engine compartment upon impact with a passer-by. New systems to be developed must therefore also integrate into that "pedestrian protection," housings which are arranged in the motor vehicle, for example the air filter housing.

BRIEF SUMMARY OF THE INVENTION

Therefore, an object of the invention is to design housings of the general kind set forth in such a way that they comply with future regulations for pedestrian protection in a crash situation. In that respect, the housing must satisfy the basic function that the mounting position or rest position of the housing is left defined in the crash situation and, in that respect, preferably also impact energy is absorbed.

In accordance with an embodiment of the invention, that object is attained in that provided on the first housing portion is an elongate support element which is connected with a proximal end to the first housing portion and has a distally disposed effective end with an effective cross-section, and the second housing portion includes an elastic fixing element with a through opening, the inside diameter of which is smaller than the effective cross-section.

In the installation position, therefore, the free end points towards the second housing portion. In the initial assembly position, that is to say after the first housing portion is connected to the second housing portion to close the housing, the effective end of the support element sits on the elastic fixing element, possibly under a slight biasing effect, without however passing through the through opening. To produce a crash function (relative movement of the housing portions relative to each other) the effective end of the support element passes through the through opening in the fixing element, by virtue of the crash force, so that the support element is displaced through or into the elastic fixing element.

The design structure according to embodiments of the invention and the correspondingly geometrical configuration of the effective cross-section and/or of the support element, as well as a suitable choice of material for the fixing element, mean that it is possible to embody a defined force/travel characteristic for implementation of pedestrian protection for known crash values. In addition, the co-operating effective surfaces of the support element and/or the fixing element can be coated in order to optimize the force/travel characteristic.

According to another embodiment the invention, it is also possible to embody a defined deceleration over a predetermined distance to avoid hard impact in relation to a passer-by.

The elastic fixing element can be fitted in a connecting region of the second housing portion.

In the simplest embodiment the first housing portion is latched in known manner to the second housing portion to implement the initial assembly function, for example by a latching fastener which is in embracing relationship on the outside. In that case, the crash function is embodied by the paired configuration of the support element and the corresponding fixing element on the housing portions.

A preferred embodiment makes it possible to combine the assembly function and the crash function in one component by the corresponding pair-wise configuration of the support element and the fixing element. That can be achieved, for example, in that proximally from the distal end the support element has an undercut configuration and the effective cross-section proximally adjoins that undercut configuration. To implement the initial assembly function the support element is first pushed into the elastic fixing element until the fixing element encloses or engages into the undercut configuration, and the housing portions are fixed in relation to each other in the initial assembly position. In that situation, the through opening of the fixing element approximately corresponds to the diameter of the smallest cross-section at the undercut configuration. In a crash the enlarged effective cross-section adjoining the undercut configuration is overcome by the impact force, and that then permits a further relative movement of the housing portions toward each other to implement the crash function. In the first step, therefore, the assembly force is first overcome for fixing the second housing portion to the first housing portion, so that the two housing portions are fixed relative to each other. From time to time in that case, the elastic return force of a seal disposed between the housing portions can also be compensated. The second stage and the force related thereto form the possible crash situation and the collision forces related thereto of a pedestrian. After those collision forces, which occur in the crash situation, are overcome it is possible to provide that the housing portions are pushed together in a defined manner in relation to each other in dependence on the selected geometries and the materials used.

If the housing portions should have to be sealed off, for example for an air filter, it is also necessary to ensure that, in the relative movement of the housing portions, the originally required sealing action and tolerance compensation are maintained. In that respect, it should be ensured that the seal does not impede the crash function. The seal is usually in the form of a hollow profile or lip profile and can be fitted as a separate component or can also be injection molded in position or foamed in position in the form of a soft component.

In accordance with a further embodiment of the invention, it is also possible to provide for stepwise flexibility depending on the respective impact force by virtue of effective cross-sections of differing natures along the longitudinal axis of the support element. Defined force/travel characteristics can be matched to each other according to the requirements involved by virtue of the geometrical configuration of the cross-sections and of the connecting region.

It is also possible to provide between the first housing portion and the second housing portion a plurality of support elements which co-operate with corresponding connecting regions with elastic fixing elements.

The configuration, according to an embodiment of the invention, of the housing portions with a defined relative displacement of the housing portions with respect to each other, under the action of a crash force to implement the crash function, can be used not just for an air filter but for all housing portions in an automobile. The arrangement of such portions in the engine compartment beneath the engine cover, however, is preferred.

The advantage of the invention is also that the movement of the first housing portion in relation to the second housing portion is reversible, that is to say, a crash does not cause any permanent damage to the system.

The connecting region can include a fixing opening in the second housing portion, into which opening is fitted an elastic element in the form of a ring, having a central through opening, for the support element. That elastic ring, which can preferably comprise an elastomer which can also be thermoplastic, can also have an inwardly projecting latching lip, which goes to a point and which is designed to correspond to the geometry of the undercut configuration, in order to ensure a seating action in the initial assembly position.

Another solution, according to an embodiment of the invention, provides that the support element has a thickening at the distal effective end, that the fixing element has a hollow body adapted to receive the thickening, that the hollow body has an upper opening and a lower opening, which are each smaller than the effective cross-section, and that the diameter of the upper opening is larger than the diameter of the lower opening. To implement the initial assembly function the thickening only has to pass through the larger upper opening, which is thus easier to overcome. In contrast, for the crash function, the thickening has to pass through the lower opening, which is narrower and therefore more difficult to overcome.

In the particularly preferred embodiment, the housing portions form constituent portions of an air filter housing. In that case, the first housing portion preferably forms the housing cover and the second housing portion forms the housing chamber for receiving the filter.

In a further development, the flow filter arranged in the air filter housing can additionally be in the form of an energy-absorbent structure with a defined force/travel characteristic.

Upon assembly at the engine side, the housing portions which are constructed in that way can additionally form an acoustic damping system.

In the preferred structural configuration of the housing portions in the form of air filter housings, the air-guiding region (uncleaned air volume, filter volume and clean air volume) forms a closed air volume within a structure formed by at least two housing halves. When mounted on the top side of an internal combustion engine, that structure can also serve as noise screening for the engine upwardly and rearwardly. In that case, the upper housing portion is preferably in the form of an engine cover with decorative elements.

In the preferred form of the housing portions constituting air filter housings, the air volume serving as a noise screening can go beyond the actual air supply volume. The structure formed from two housing halves can enclose further regions which thereby act as noise screening primarily upwardly and rearwardly, when arranged at the engine side. In addition, it is also possible in that way, for example, to integrate a resonator function without involving additional components. Accordingly, an additional structure damping function is afforded by decoupled mounting of the overall structure on the engine with elastic elements.

The above-described design configuration means that it is possible to dispense with the otherwise usual foam moldings or felts for noise screening beneath the engine cover. The dual function of the air supply volume as noise screening and the dual function of the engine cover as a housing component provides that the number of components in the engine compartment is considerably reduced, which reduces the overall costs of the vehicle.

Usually the housing is in the form of a plastic material injection molding. Preferred plastic materials are fiber-reinforced plastic materials. Thermoplastic molding materials are preferably used as the plastic materials. In addition, it is also possible to use thermosetting materials, natural fiber materials or metals or combinations thereof (hybrid technology).

The above-mentioned plastic materials can have further conventional additives and fillers. Such substances are, for example, lubricant or mold release agents, waxes, pigments, coloring agents, flame-protection agents, anti-oxidants, stabilizers against the effect of light or anti-static agents.

The plastic material used generally has fibers in an amount of between 3 and 40% by weight. Carbon, aramid or glass fibers, cut glass fiber or fiber glass rovings may be mentioned as examples of fillers in fiber form. Glass fibers are particularly preferred. In addition, it is possible to use natural fibers such as flax, hemp, jute, sisal, ramie or carnaf as the fibers. The glass fibers used can be of E-, A- or C-glass and are preferably provided with a size and/or a bonding agent. The diameter thereof is generally between 6 and 30 μm. It is possible to use both endless fibers (rovings) and also cut glass fibers (staple) of a length of between 1 and 30 mm.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

In the drawings identical parts or parts which have the same action are denoted by the same reference numerals.

DETAILED DESCRIPTION OF THE INVENTION

Figure 1:
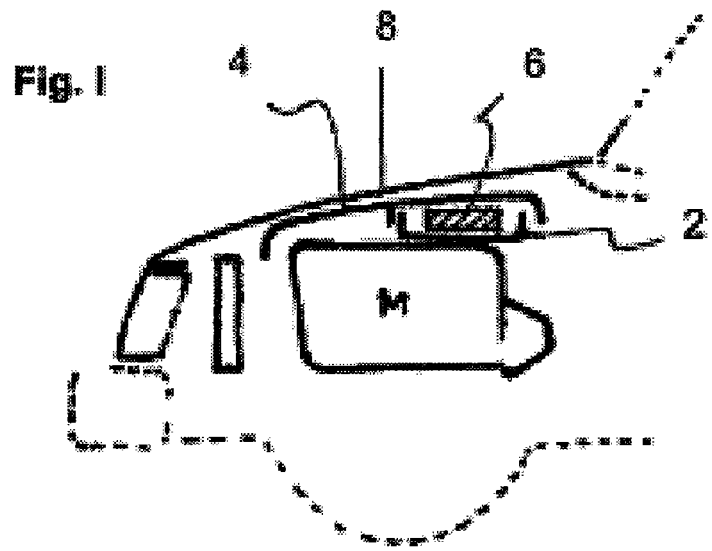
FIG. 1 is a simplified, diagrammatic, side view showing the principle of an engine compartment of an automobile.

In accordance with the diagrammatic view in FIG. 1 the air filter housing according to an embodiment of the invention is arranged between a lower housing portion 2 and an engine cover 4 for receiving an air filter insert 6 beneath an engine hood of an automobile in the engine compartment above an engine M. The engine cover 4 in that case forms the housing cover of the air filter housing.

Figure 2:
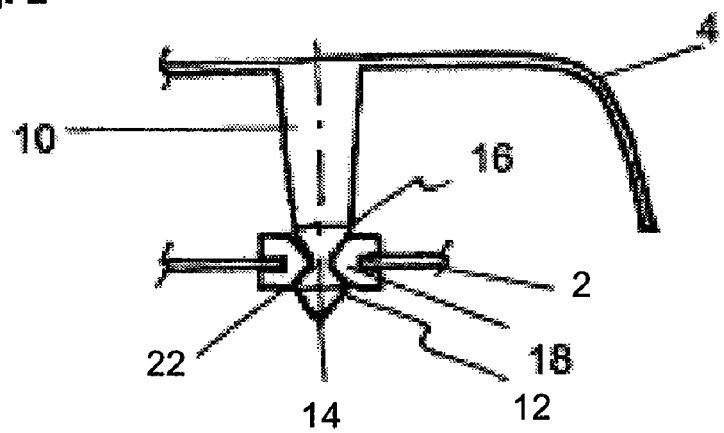
FIG. 2 is a diagrammatic side view on an enlarged scale illustrating the principle of a connecting region designed in accordance with an embodiment of the invention.

FIG. 2 shows a diagrammatic view on an enlarged scale illustrating the principle of the connecting region designed in accordance with an embodiment of the invention between the engine cover 4 and the lower housing portion 2. The engine cover 4, which is in the form of a one-piece plastic material injection molding, has a support bar 10 which is formed thereon and which in the position of installation projects in the direction of the lower housing portion 2. The support bar 10 is integrally shaped on the engine cover 4 with a proximal end and, proximally from a distal free end 12, has an undercut configuration 14. A conical cross-sectional enlargement, which ends in an effective cross-section 16, is shaped proximally from that undercut configuration 14.

An elastic fixing element in the form of an elastic ring 18, with a central through opening, is snapped in position in a connecting region of the lower housing portion 2. The inside diameter of the through opening is smaller than the effective cross-section 16 of the support bar 10.

When setting the engine cover 4 in place in the context of initial assembly, after insertion of the air filter insert 6, the support bar 10 is pushed into the elastic ring 18 until an inwardly projecting elastic latching lip 22, which terminates in a point, engages into the undercut configuration 14. In that position the engine cover 10 is in the initial assembly function and is fixed in a biased condition on the lower housing portion 2 by virtue of an elastic seal (not shown) arranged between the lower housing portion 2 and the engine cover 4 in the edge region.

In a crash situation the crash force acting on the engine hood 8, besides the engine hood 8, also causes the engine cover 4 to be pushed further into the ring 18 in the axial direction of the support bar 10. In that situation the return force, which is defined by the geometry of the effective cross-section 16, the latching lip 22 and the material property of the ring 18 and which counteracts the crash force, must be overcome to permit a relative displacement of the engine cover 4 in a direction towards the lower housing portion 2.

Figure 3:
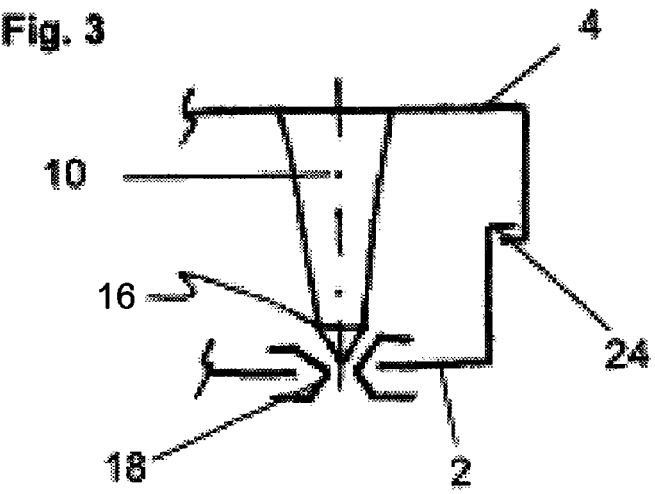
FIG. 3 is a diagrammatic side view on an enlarged scale showing the principle of an alternative embodiment of the connecting region according to the invention.

FIG. 3 shows an alternative embodiment of the connecting region according to the invention between an engine cover 4 and a lower housing portion 2 to provide pedestrian protection. In this embodiment, in contrast to the embodiment of FIG. 2, the initial assembly function and the crash function are separated from each other and the two are not implemented by the pair-wise configuration of the support bar 10 and the elastic fixing element. With this structure, the initial assembly function is implemented by a latching edge 24 provided peripherally between the lower housing portion 2 and the engine cover 4. In that position the support bar 10 which is formed integrally on the engine cover 4 is fitted in a biased condition into the elastic ring 18 mounted in the lower housing portion 2, with its latching lip 22 projecting towards the center. Under the action of the crash force the support bar 10 is pushed in the axial direction into the ring 18 and in so doing urges the elastic ring 18 apart, so that the support bar 10 passes through the central through opening, overcoming the crash force.

Figure 4:
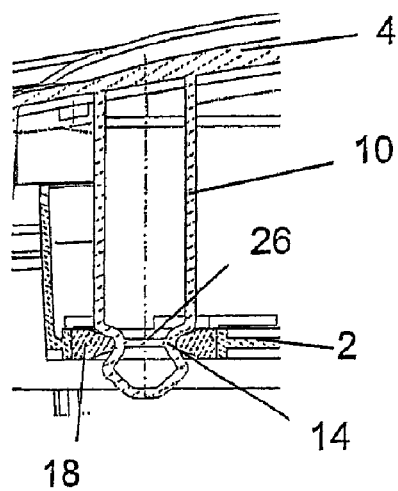
FIG. 4 is a view in longitudinal sectional view on an enlarged scale through a first embodiment of a connecting region according to the invention.
Figure 5:
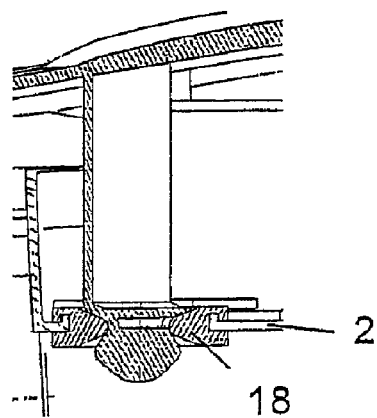
FIG. 5 is a view in longitudinal sectional view on an enlarged scale through a second embodiment of a connecting region according to the invention.
Figure 6:
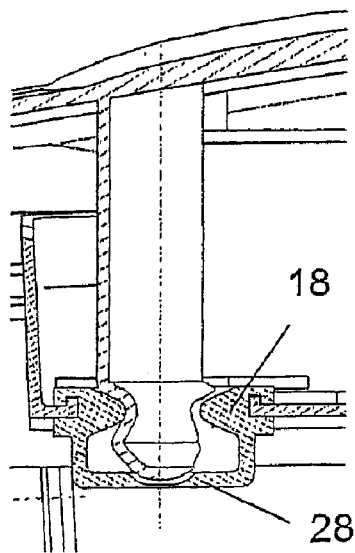
FIG. 6 is a view in longitudinal sectional view on an enlarged scale through a third embodiment of a connecting region according to the invention.

FIGS. 4, 5 and 6 show various configurations of the functional members according to the invention, the "elastic fixing element" and the "support element," in cross-sections on an enlarged scale. In all cases, the support bar 10 is formed integrally on the engine cover 4.

In the embodiment shown in FIG. 4 the support bar 10 is in the form of a hollow body which is closed all around and which has an undercut configuration 14, proximally from the distal free end 12. A transverse strut 26 is shaped at the inside, to reinforce the cross-sectional region at the undercut configuration 14. In the embodiment of FIG. 4 the elastic ring 18 is injection molded on a fixing opening of the lower housing portion 2.

FIG. 5 shows a further embodiment in which the support bar 10 is structured with a peripheral surface that is open at one side. Otherwise it is of a geometrical configuration like the support bar in FIG. 4. In addition, in the embodiment of FIG. 5 the elastic ring 18 is mounted to the fixing opening of the lower housing portion 2. For that purpose, the ring has in the outer peripheral surface a peripherally extending engagement groove into which a peripherally extending hooking limb of a corresponding configuration engages in the installation position. The elastic ring 18 is of such a geometrical configuration that it sits in a biased condition in the fixing opening of the lower housing portion 2.

FIG. 6 shows a further embodiment of the elastic ring 18, which is mounted to the lower housing portion 2 in the manner shown in FIG. 5, but which also has at the lower end an integrally formed cover hood 28, which provides additional elastic forces which have to be overcome in a crash situation.

Figure 7:
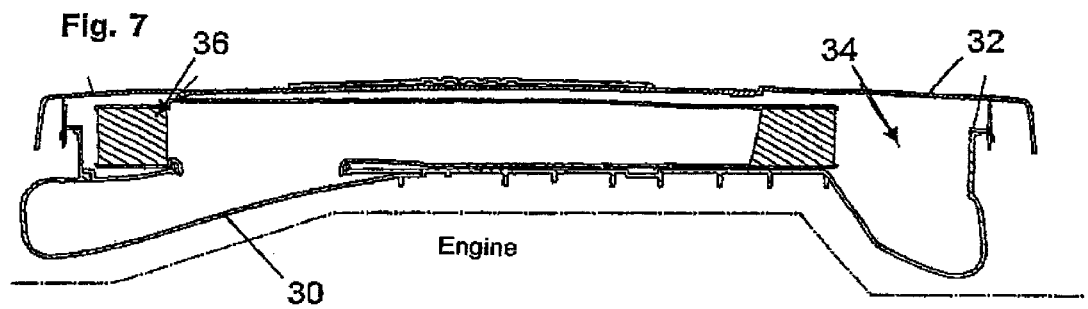
FIG. 7 is a diagrammatic, longitudinal sectional view illustrating the principle of an engine cover according to an embodiment of the invention, which is in the form of an air filter housing.

In the diagrammatic view in FIG. 7, showing the principle of an engine cover in longitudinal section, an air filter housing is integrated therein. The support elements according to the invention are not visible in this view. The engine cover is arranged above an engine and includes a pot-shaped lower housing shell portion 30 and an upper housing shell portion 32 in the form of a cover and which is connected to the lower shell portion 30 by the support elements according to the invention. The lower housing shell portion 30 and the upper housing shell portion 32 include between them a space which is enclosed on all sides and which forms a closed air supply volume 34. A known air filter element 36 is also fitted therein.

Figure 8:
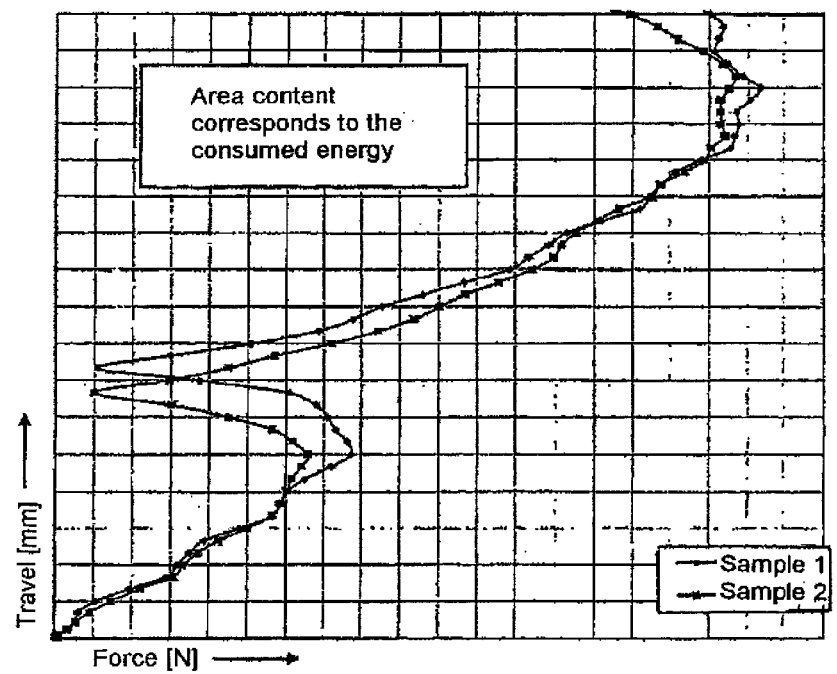
FIG. 8 is a graphical representation illustrating the force/travel characteristic in the event of a defined deceleration by example of two housing portions connected according to an embodiment of the invention.
Figure 9:
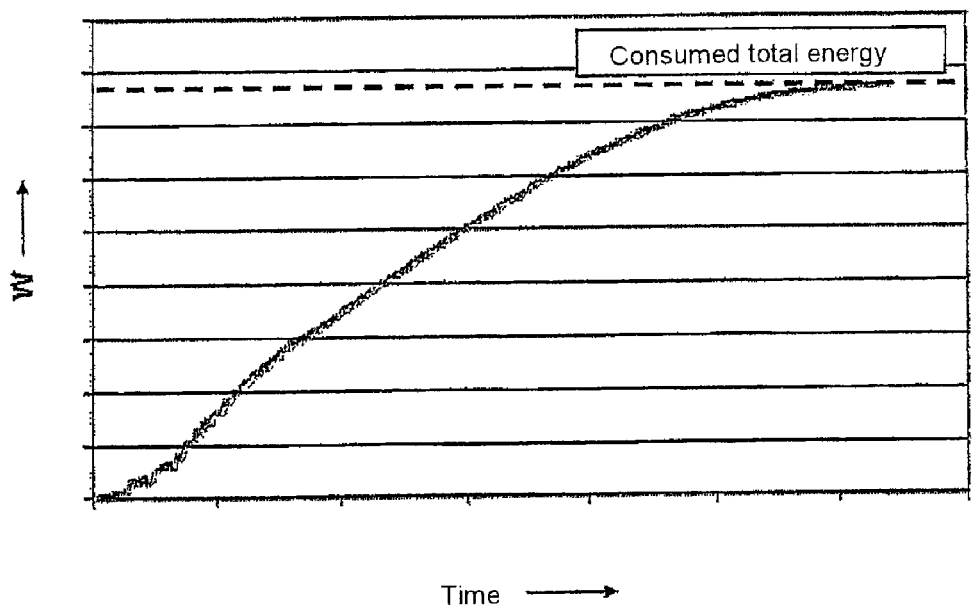
FIG. 9 is a graphical representation showing the work (W) consumed in relation to time during a defined deceleration by example of the housing portions connected according to an embodiment of the invention.

To clearly illustrate the defined deceleration which can be achieved in accordance with the invention, FIGS. 8 and 9 show a typical force/travel characteristic and the work/time characteristic which occurs when two components designed in accordance with embodiments of the invention are displaced relative to each other.

FIG. 8 shows how the geometrical configuration of the support bar 10 shown in FIG. 2 and the elastic ring 18 provide that the force for overcoming the conical proximal end first rises to the first apex point and then falls again almost to 0 when the ring 18 engages into the undercut configuration 14. In that position, the upper housing portion is in its initial assembly position. In the collision situation the force continuously increases to the second apex point by virtue of the conical configuration of the support bar 10, in which case the force at the second apex point is approximately three times as great as that of the first apex point. Other force configuration patterns can be achieved as desired, by virtue of the use involved, by means of a different configuration in respect of the geometries of the support bar 10 and/or the ring 18.

Finally FIG. 9 shows the work (W) consumed in relation to time during a deceleration defined by example, wherein the apex point represents the total energy consumed.

The subject-matter of the present invention arises not just from the subject-matter of the individual claims but from the combination of the individual claims with each other. All details and features disclosed in the documents—including the Abstract—, in particular the spatial design configuration shown in the drawings, are claimed as essential to the invention insofar as they are novel individually or in combination over the state of the art.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A housing securable to a motor vehicle, the housing comprising a first housing portion and a second housing portion connectable thereto, an elongate support element (10) provided on the first housing portion connected with a proximal end to the first housing portion and having a distally disposed effective end with a first effective cross-section (16), and the second housing portion having an elastic fixing element with a through opening, the inside diameter of through opening being smaller than the first effective cross-section (16), wherein the housing is adapted to produce a defined deceleration over a predetermined travel to avoid hard impact in respect of a pedestrian.

2. The housing as set forth in claim 1, wherein the support element (10), proximally of its free end (12), has an undercut configuration (14) forming a second effective cross-section, and wherein the first effective cross-section (16) proximally adjoins the undercut configuration (14).

3. The housing as set forth in claim 1, wherein the fixing element is arranged in a connecting region which has a fixing opening, and the fixing element has a ring (18) inserted into the fixing opening with a through opening.

4. The housing as set forth in claim 1, wherein the support element at the distal end has a thickening with the first effective cross-section, the fixing element has a hollow body adapted to receive the thickening, the hollow body has an upper opening and a lower opening which are each smaller than the first effective cross-section, and the diameter of the upper opening is larger than the diameter of the lower opening.

5. The housing as set forth in claim 1, wherein the first housing portion has a form of a housing cover and the second housing portion has a form of a lower housing portion (2).

6. The housing as set forth in claim 1, wherein the housing portions have a form of air filter housings.

7. The housing as set forth in claim 6, wherein the upper housing portion is integrated in an engine cover (4).

8. The housing as set forth in claim 7, wherein the engine cover has a form of a decorative element.

9. The housing as set forth in claim 6, wherein a filter element is additionally arranged in at least one of the air filter housings.

10. The housing as set forth in claim 1, wherein the housing has a form of a plastic material housing.

11. The housing as set forth in claim 1, wherein a defined force/travel characteristic can be achieved by a geometrical configuration of the first effective cross-section (16) and/or of the support element (10).

12. The housing as set forth in claim 1, wherein a defined force/travel characteristic can be achieved by a material selection for the fixing element.

13. The housing as set forth in claim 1, wherein an effective surface of the support element (10) and/or the elastic fixing element is coated.

14. The housing as set forth in claim 6, wherein the air filter housings include at least two housing portions.

15. The housing as set forth in claim 14, wherein the at least two housing portions enclose an air supply volume.

16. The housing as set forth in claim 15, wherein the air supply volume forms a closed air volume.

17. The housing as set forth in claim 14, wherein a structure formed by the at least two housing portions is adapted to be noise-screening.

* * * * *